US007590460B2

(12) United States Patent
Nishioka et al.

(10) Patent No.: US 7,590,460 B2
(45) Date of Patent: Sep. 15, 2009

(54) AUDIO SIGNAL PROCESSOR

(75) Inventors: Naotoshi Nishioka, Hamamatsu (JP);
Hiroyuki Toda, Hamamatsu (JP);
Yasuyuki Muraki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 951 days.

(21) Appl. No.: 10/976,117

(22) Filed: Oct. 28, 2004

(65) Prior Publication Data
US 2005/0096766 A1    May 5, 2005

(30) Foreign Application Priority Data

Oct. 29, 2003  (JP)  ............... 2003-369329
Oct. 29, 2003  (JP)  ............... 2003-369330

(51) Int. Cl.
G06F 17/00 (2006.01)
(52) U.S. Cl. ........................................ 700/94
(58) Field of Classification Search ................ 700/94;
712/35, 36; 713/310, 320, 330, 340; 381/119,
381/61; 369/4
See application file for complete search history.

(56) References Cited

U.S. PATENT DOCUMENTS

| 4,570,523 A | 2/1986 | Futamase et al. |
| 5,744,741 A | 4/1998 | Nakajima et al. |
| 5,917,781 A | 6/1999 | Kim |
| 6,397,321 B1 | 5/2002 | Yamamoto et al. |

FOREIGN PATENT DOCUMENTS

| JP | S58-21299 | 2/1983 |
| JP | 5181479 | 7/1993 |
| JP | 2000057122 | 2/2000 |
| JP | 2000-122650 | 4/2000 |
| TW | 002654550 | 12/1995 |

OTHER PUBLICATIONS

Notice of Rejection, Japanese Patent Office (Japan), (Dec. 12, 2006).
Taiwan Search Report (Citing TW 00264550 and U.S. 5,917,781, dated Jan. 25, 2007).
Japanese Patent Office ("Decision of Rejection", Dated Jun. 26, 2007).
"Notice of Rejection," Office Action for 2003-369330, Japanese Patent Office (Japan), pp. 1-4, (Jul. 18, 2006).

Primary Examiner—Curtis Kuntz
Assistant Examiner—Andrew C Flanders
(74) Attorney, Agent, or Firm—Pillsbury Winthrop Shaw Pittman LLP

(57) ABSTRACT

An audio signal processor is composed of a data path unit, a mode register and a state machine unit. The data path unit applies one or more arithmetical operation to an audio signal for performing signal processing of the audio signal. The mode register stores mode information specifying the signal processing to be performed by the data path unit. The state machine unit sequentially feeds control signals according to the mode information for enabling the data path unit to apply one or more arithmetical operation to the audio signal so as to perform the signal processing. The performed signal processing is composed of the one or more arithmetical operations, and is specified by the mode information stored in the mode register.

7 Claims, 12 Drawing Sheets

FIG.8

| CURRENT STATE | MODE | DATA OUTPUT DESTINATION | NEXT STATE |
|---|---|---|---|
| IDLE | 0 | – | LOAD |
|  | 1 | – | LOAD |
|  | ∫ | – | ∫ |
|  | n−1 | – | LOAD |
| SRC | 0 | VOL | VOL |
|  | 1 | VOL | VOL |
|  | ∫ | ∫ | ∫ |
|  | n−1 | VOL | VOL |
| VOL | 0 | MIX | MIX |
|  | 1 | MIX | EQ |
|  | ∫ | ∫ | ∫ |
|  | n−1 | MIX | EQ |
| MIX | 0 | EQ | EQ |
|  | 1 | VSP | VSP |
|  | ∫ | ∫ | ∫ |
|  | n−1 | FADE | FADE |

| | | | |
|---|---|---|---|
| FADE | 0 | D/A | IDLE |
|  | 1 | D/A | IDLE |
|  | ∫ | ∫ | ∫ |
|  | n−1 | D/A | IDLE |

AUDIO SIGNAL PROCESSOR

BACKGROUND OF THE INVENTION

The present invention relates to an audio signal processor for performing various acoustic processing for audio signals.

There have been provided audio signal processors capable of performing a plurality of types of arithmetical operations such as filtering, equalizer processing and sound image localization for audio signals. In this regard, filtering and other arithmetical operations each require a relatively large arithmetic circuit including a multiplier and an accumulator. Therefore, if it is attempted to form an audio signal processor capable of performing complicated signal processing composed of a plurality of arithmetical operations, a circuit therefore becomes extremely large. Moreover, the large circuit leads to high power consumption of the audio signal processor due to operation of the circuit. On the other hand, some audio signal processors perform signal processing by receiving audio signals of a plurality of channels in different formats such as, for example, different sampling frequencies. In this type of audio signal processor, signal processing is performed for input digital audio signals using arithmetic circuits prepared for respective channels, the digital audio signals of the respective channels after the signal processing are D/A converted, and then the signals are mixed and output. Since this type of audio equipment has an arithmetic circuit for each channel, it has also a large-sized circuit for signal processing and is high in power consumption. To resolve these drawbacks, there has been provided an audio signal processor for sequentially performing a plurality of types of arithmetical operations such as filtering and equalizer processing with time sharing control by using a common arithmetic circuit. According to this type of audio signal processor, a single arithmetic circuit is used under the time sharing control, and therefore a compact circuitry is achieved. This type of audio signal processor is disclosed in, for example, Patent Document 1, Japanese Laid-Open Patent Publication (Kokai) No. H12(2000)-122650.

The aforementioned conventional audio signal processor sequentially performs predetermined types of arithmetical operations in the fixed order. Therefore, when it is attempted to provide market with audio signal processors different in contents of audio signal processing conforming to various specifications, there is a need for developing and manufacturing audio signal processors for each of the specifications, thereby increasing development and manufacturing costs problematically. As a method of resolving this problem, there is a method of realizing diverse specifications, for example, by preparing a so-called full-featured audio signal processor, which can perform various arithmetical operations such as filtering, equalizer processing and sound image localization, and then omitting filtering for example in some specifications, but not omitting filtering in other specifications or so. For example, in filtering, the omission of the arithmetical operation can be achieved by a method of setting a filter coefficient for a filtering operation at "1" so as to make digital audio signals pass by the arithmetic circuit. Even if being passed by, however, the arithmetic circuit operates at that time and therefore wasteful power is consumed for unnecessary signal processing problematically.

Audio signal processors capable of performing various signal processing for audio data of a plurality of channels are in widespread use. Focusing on a configuration for signal processing, these audio signal processors can be mainly classified into two types. As shown in FIG. 13, a first audio signal processor has a data path for signal processing for each channel and performs the signal processing for audio data of the respective channels in parallel. As shown in FIG. 14, a second audio signal processor has a single data path common to respective channels and sequentially performs signal processing for audio data of the respective channels with time sharing control by using the single data path. As a technical literature disclosing the second audio signal processor, there is, for example, patent document 2, Japanese Laid-Open Patent Publication (Kokai) No. 2000-122680.

According to the aforementioned first audio signal processor, it is possible to reduce power consumption by deactivating data paths of channels not in use. This audio signal processor, however, has a problem that a data path need be provided for each channel, thereby causing a large-sized processor, by which a chip area becomes large when it is formed by an LSI. According to the second audio signal processor, only a single data path need be provided, thereby enabling a small-sized processor device. Therefore, when it is formed by an LSI, the chip area can be reduced. This audio signal processor, however, always performs operations of all channels even if audio data of only a part of channels is input, and therefore it performs essentially unnecessary operations, thereby consuming wasteful power problematically.

SUMMARY OF THE INVENTION

In view of the circumstances stated above, the present invention has been provided. Therefore, it is an object of the present invention to provide an audio signal processor capable of holding down power consumption and performing a wide variety of signal processing. It is another object of the present invention to provide an audio signal processor of a plurality of channels capable of achieving a downsized configuration and holding down power consumption.

To achieve the above noted objects, the present invention provides in its one aspect an audio signal processor, which comprises a data path unit that applies one or more arithmetical operation to an audio signal for performing signal processing of the audio signal, a mode register that stores mode information specifying the signal processing to be performed by the data path unit, and a state machine unit that sequentially feeds control signals for enabling the data path unit to apply one or more arithmetical operation to the audio signal so as to perform the signal processing, which is composed of the one or more arithmetical operations and which is specified by the mode information stored in the mode register.

According to this audio signal processor, the data path unit can be caused to perform a variety of signal processing by updating the mode information held in the mode register. Moreover, the data path unit performs only the arithmetical operations forming the signal processing without wasteful operations, thereby holding down the power consumption.

In a preferred mode, the state machine unit feeds the control signal conveying information indicating a location of input data of the audio signal to be subjected to each arithmetical operation and information indicating an output destination for the result of each arithmetical operation.

The inventive audio signal processor may further comprises a plurality of interfaces that receive an audio signal from an outside or generate an audio signal based on a source signal supplied from the outside and that supply the audio signals to the data path unit, wherein the state machine unit generates a control signal for enabling the data path unit to execute an arithmetical operation for converting a format of the audio signals supplied from the interfaces to a predetermined format. In such a case, the state machine unit generates a control signal for enabling the data path unit to execute an arithmetical operation for mixing a plurality of audio signals which have a same format and which are loaded into the data path unit.

Preferably, the state machine unit generates a control signal every time a clock pulse is supplied at a given period for enabling the data path unit to perform the signal processing specified by the mode information stored in the mode register. In such a case, the data path unit provides the state machine unit with a status signal, which indicates a state of the arithmetical operation under execution, and the state machine unit determines on the basis of the provided status signal a content of the control signal which should be sent to the data path unit when a next clock pulse is supplied.

Preferably, the state machine unit sequentially feeds the control signals for enabling the data path unit to continuously execute a plurality of arithmetical operations which constitute the signal processing specified by the mode information.

In another aspect of the invention, there is provided an audio signal processor, which comprises a plurality of interfaces that receive audio data of a plurality of channels, respectively, a detecting unit that generates a status signal indicating whether each channel is an active state or an inactive state based on the audio data of the plurality of the channels inputted via the plurality of the interfaces, and an audio signal processing unit that performs signal processing for the audio data of the plurality of the channels in a time-divisional manner, wherein the audio signal processing unit determines whether each channel is the active state or the inactive state based on the status signal outputted from the detecting unit, and performs the signal processing only for the audio data of the channels in the active state and stops the signal processing for the audio data of the channels in the inactive state.

According to this aspect of the present invention, the detecting unit detects whether each channel is active or inactive, and the audio signal processing unit performs only the signal processing for the audio data of the active channels and stops the signal processing for the audio data of the inactive channels. Therefore, it is possible to prevent wasteful signal processing and to hold down power consumption required for signal processing.

In a preferred mode, the detecting unit generates the status signal indicating that the channel is the inactive state if the audio data of the channel stops over a given period of time. According to this mode, if audio data of a certain channel stops during execution of signal processing of a delay system such as reverberation processing in the audio signal processing unit, signal processing of the relevant channel stops at appropriate timing after an elapse of the given period of time. Therefore, it is possible to prevent a disadvantage that the reverberation processing or the like is interrupted during the execution.

In another preferred mode, the detecting unit generates a first status signal when the audio data of the channel continuously stops for more than a first time period and generates a second status signal when the audio data of the channel continuously stops for more than a second time period longer than the first time period, and the audio signal processing unit stops a part of the signal processing of the channel if the first status signal is generated from the detecting unit for the channel, and stops a whole of the signal processing of the channel if the second status signal is generated for the channel. According to this mode, a given type of signal processing is stopped at the time of an output of the first status signal generated by the stop of the audio data regarding the given type of signal processing not affected if it is interrupted at the time of the stop of the audio data, and other types of signal processing are stopped if the audio data stopped condition continues for a given or longer period of time. Therefore, it is possible to hold down power consumption further in comparison with the aforementioned mode.

BRIEF DESCRIPTION OF THE DRAWINGS

FIG. 8 is a diagram showing a decision table for use in an audio signal processor of a second embodiment of the present invention.

DETAILED DESCRIPTION OF THE INVENTION

Embodiments of the present invention will be described hereinafter by referring to drawings.

First Embodiment

Figure 1:
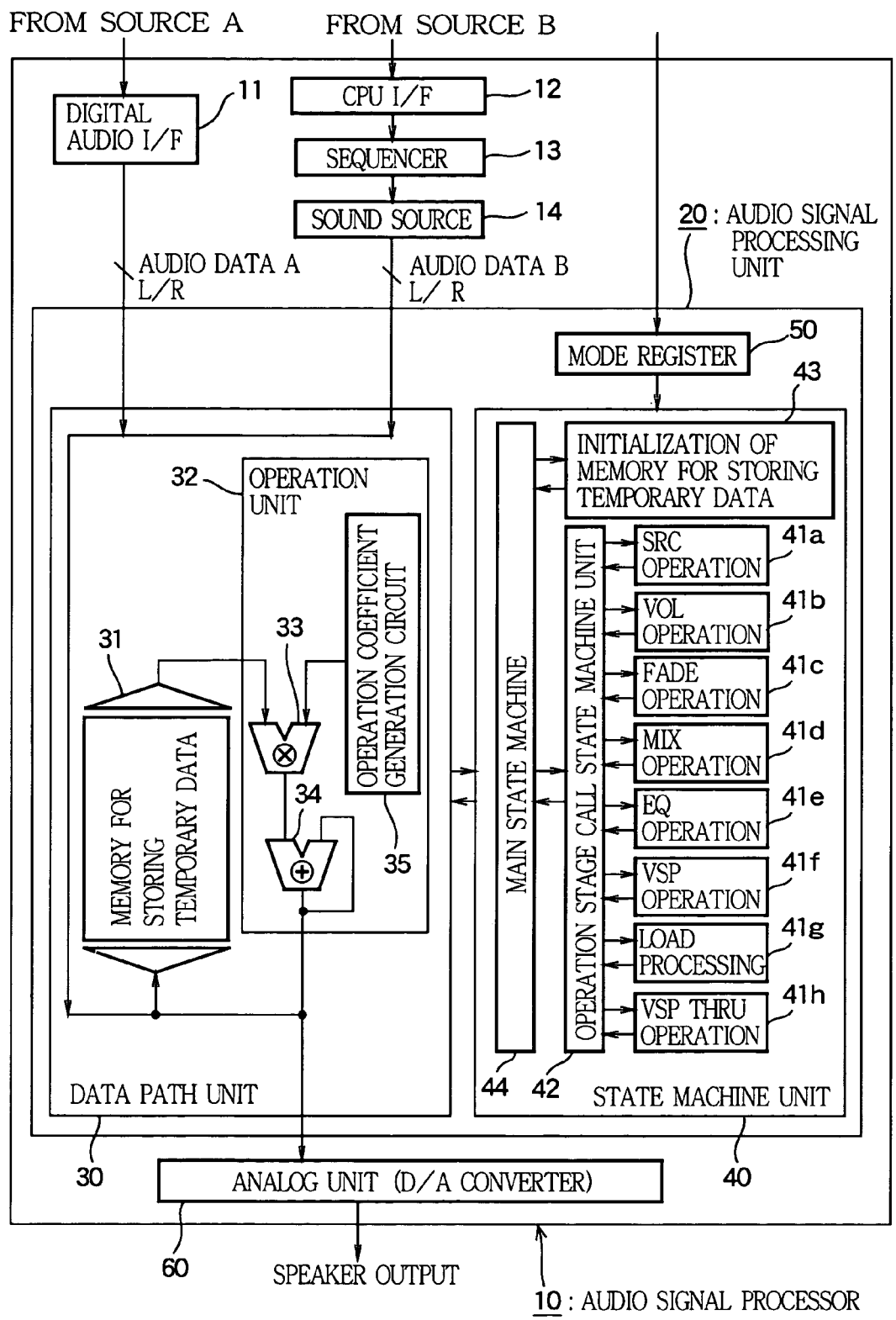
FIG. 1 is a block diagram showing a configuration of an audio signal processor according to a first embodiment of the present invention.

FIG. 1 illustrates a block diagram showing a configuration of an audio signal processor 10 of a first embodiment of the present invention. The audio signal processor 10 is an LSI comprising a circuit equivalent to shown components formed on a semiconductor chip, and it is mounted on various audio equipment requiring effector function, mixing function, or other functions.

The audio signal processor 10 according to this embodiment receives time-series audio data generated by sampling audio waveforms from a source A, receives performance data from a source B, and processes them. In this regard, the source A is, for example, an external device connected to audio equipment on which the audio signal processor 10 is mounted or an audio reproducer such as an MP3 (MPEG 1 layer 3) decoder built in the audio equipment. The source B is, for example, a host processor for controlling the audio signal processor 10 in the audio equipment on which the audio signal processor 10 is mounted.

To receive the audio data from the source A, the audio signal processor 10 is provided with a digital audio I/F 11. In this embodiment, audio data A having a sampling frequency f1 of two channels L and R is entered via the digital audio I/F 11.

Moreover, to acquire audio data by receiving performance data from the source B, the audio signal processor 10 is provided with a CPU I/F 12, a sequencer 13, and a sound source 14. The performance data is supplied to the sequencer 13 via the CPU I/F 12 from the source B. The performance data is sequential data, and the sequential data includes a series of event data specifying controls of the sound source 14 such as note-on and note-off and duration data specifying intervals for sending respective event data to the sound source 14. The sequencer 13 controls timing for sending event data to the sound source 14. More specifically, if certain event data is sent to the sound source 14, the sequencer 13 repeats an operation of awaiting an elapse of the time equivalent to duration data associated with subsequent event data and sending out the subsequent event data to the sound source 14. In a preferred embodiment, the sound source 14 generates stereo-sampled audio data. In this embodiment, when note-on event data is supplied, the sound source 14 outputs audio data B having a sampling frequency f2 of two channels L and R showing different waveforms respectively. In another preferred embodiment, the sound source 14 generates monaural-sampled audio data. In this embodiment, when note-on event data is supplied, the sound source 14 generates monaural audio data having the sampling frequency f2. The audio data is allocated to the audio data B of two channels L and R at a volume ratio corresponding to a coefficient of a panoramic potentiometer indicating a location of sound image localization, and then it is output from the sound source 14.

An audio signal processing unit 20 performs signal processing for the audio data A and B obtained from the digital audio I/F 11 and the sound source 14 respectively and outputs digital signals of the two channels L and R as a result of the processing. Inside the audio signal processing unit 20, a clock generator not shown generates sampling clock pulses CLK having frequency fs and operation clock pulses MCLK faster than CLK. In the audio signal processing unit 20, signal processing for the audio data A and B is performed with being triggered by a generation of a sampling clock pulse CLK every time it occurs. Timing control of the components for the signal processing is performed in synchronization with the operation clock pulses MCLK. In this embodiment, the frequency fs of the sampling clock pulse is the same as the sampling frequency f2 of the audio data B. Therefore, the audio data B can be directly processed in the audio signal processing unit 20 without a conversion of the sampling frequency. The sampling frequency f1 of the audio data A differs from the frequency fs (=f2). Therefore, in this embodiment, the audio data A is captured into the audio signal processing unit 20 and thereafter its sampling frequency is converted from f1 to fs (=f2) as an SRC operation. The SRC operation will be described later.

As shown in FIG. 1, the audio signal processing unit 20 has a data path unit 30, a state machine unit 40, and a mode register 50. The data path unit 30 has a memory for storing temporary data 31 and an operation unit 32. The memory for storing temporary data 31 is used as a buffering area for temporarily storing the audio data A and B to be processed and as a temporary storage area for temporarily storing digital data under signal processing. The operation unit 32 is a device for performing an arithmetical operation for data read from the memory for storing temporary data 31, having a multiplier 33, an accumulator 34, and an operation coefficient generation circuit 35. In this regard, the multiplier 33 is a circuit for multiplying data read from the memory for storing temporary data 31 by an operation coefficient, and the operation coefficient generation circuit 35 is for generating the operation coefficient. What operation coefficient should be generated is determined based on a type of operation to be performed for target data. The accumulator 34 is a circuit for accumulating a result of multiplication output from the multiplier 33 every time the result of multiplication is output. Besides the operation of accumulating the results of multiplication of the multiplier 33, the accumulator 34 is capable of a through operation where a result of multiplication is caused to skip the accumulation. It is determined according to control signals supplied from the state machine unit 40 what operation should be performed by the operation unit 32 in the above, which area data in the memory for storing temporary data 31 should be a target of the arithmetical operation, and to which the output data from the accumulator 34 as a result of operation should be supplied.

The state machine unit 40 is supplied with a status signal indicating an internal state of the data path unit 30. The state machine unit 40 is a device for monitoring a change in the internal state of the data path unit 30 based on the status signal and for outputting a control signal based on a result of the monitoring to cause the data path unit 30 to perform various signal processing.

The state machine unit 40 has operation state machines 41a to 41h as means for controlling execution of arithmetical operations of the data path unit 30. The following lists arithmetical operations performed by the data path unit 30 under the control of these operation state machines:

a. SRC (Sampling Rate Conversion) Operation

It is processing of reading audio data of the sampling frequency f1 from the memory for storing temporary data 31 and converting it to audio data of the sampling frequency fs (=f2). It is performed under the control of the operation state machine 41a.

b. VOL (Volume) Operation

It is processing of reading audio data from the memory for storing temporary data 31 and adjusting its volume. It is performed under the control of the operation state machine 41b.

c. FADE (Fade) Operation

It is processing of reading audio data from the memory for storing temporary data 31 and temporarily controlling the volume to an inaudible level (muting level). It is performed under the control of the operation state machine 41c.

d. MIX (Digital Mix) Operation

It is processing of reading two types of audio data from the memory for storing temporary data 31 and mixing them. It is performed under the control of the operation state machine 41d.

e. EQ (Digital Equalizer) Operation

It is processing of reading audio data from the memory for storing temporary data 31 and adjusting a level for each frequency band. It is performed under the control of the operation state machine 41e.

f. VSP (Virtual Speaker Position) Operation

Figure 2:
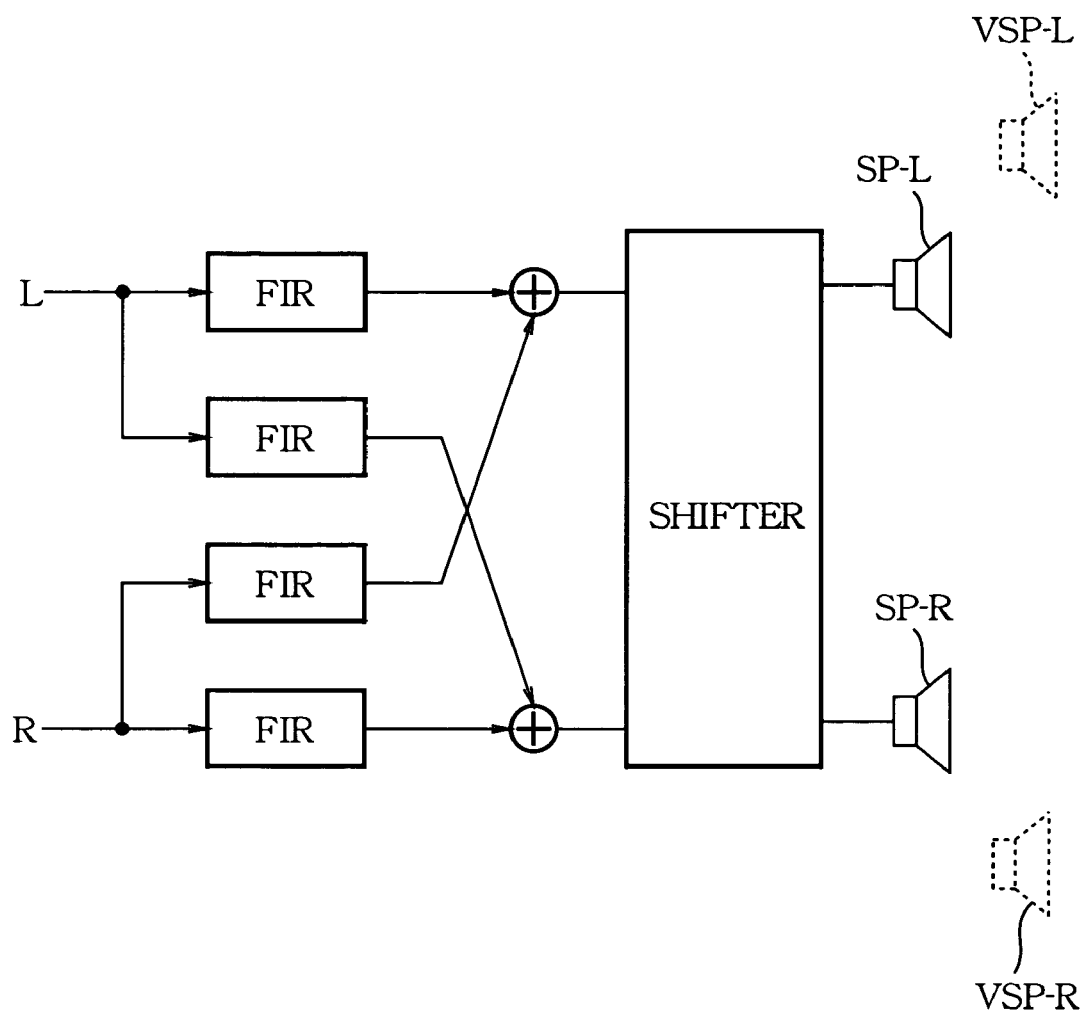
FIG. 2 is a diagram showing a content of a VSP operation performed in the first embodiment.

As shown in FIG. 2, it is processing of reading audio data of L and R channels from the memory for storing temporary data 31, convoluting FIR (finite impulse response) filter coefficient strings prepared for positions of virtual speakers VSP-L and VSP-R with the respective data, and performing level shifting. It is performed under the control of the operation state machine 41f. If the audio data of the L and R channels after the VSP operation is D/A converted and output from left and right speakers SP-L and SP-R, it is possible to have an auditory effect on a listener just as if sounds of the L and R channels were output from the virtual speakers VSP-L and VSP-R.

g. LOAD (Data Load) Operation

It is processing of storing the audio data A and B once into a buffering area of the memory for storing temporary data 31 and delivering these data to an arithmetical operation requiring the data. It is performed under the control of the operation state machine 41g.

h. VSP THRU (VSP Through) Operation

It is processing of reading audio data of the L and R channels from the memory for storing temporary data 31 and performing the VSP operation with an omission of the FIR filtering operation, in other words, performing the shift operation in FIG. 2. It is performed under the control of the operation state machine 41h.

Figure 3:
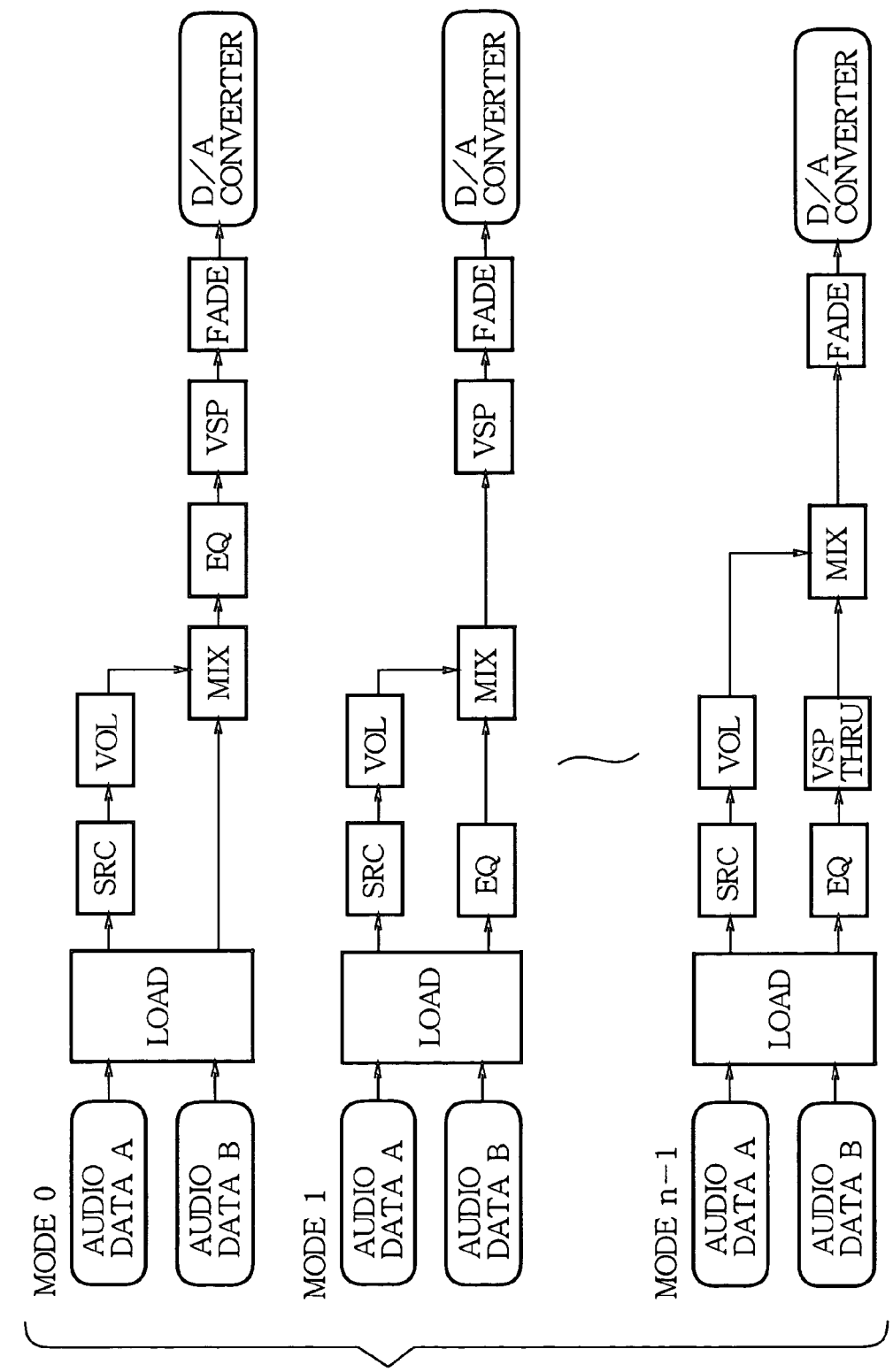
FIG. 3 is a diagram showing an example of signal processing that can be performed in the first embodiment.

The audio signal processing unit 20 in this embodiment can perform various signal processing made of the aforementioned arithmetical operations combined. Signal processing that can be performed by the audio signal processing unit 20 has, as shown in FIG. 3, n types of modes 0 to n−1. Mode information is written into a mode register 50 in the audio signal processing unit 20 to specify which mode should be selected out of the modes 0 to n−1 for signal processing. In a preferred embodiment, the mode information is written into the mode register 50 according to a control of an operating portion of the equipment on which the audio signal processor 10 is mounted. In another preferred embodiment, the host processor controlling the audio signal processor 10 writes the mode information into the mode register 50 according to software. There can be an embodiment in which the mode register 50 is formed by a nonvolatile memory and given mode information is written into the mode register 50 at the factory before shipment.

An operation stage call state machine unit 42 is an assembly of n operation stage call state machines for causing the data path unit 30 to perform respective signal processing corresponding to the modes 0 to n−1 shown in FIG. 3. In the state machine unit 40, an operation stage call state machine corresponding to a mode specified by the mode information in the mode register 50 among these operation stage call state machines are started every time a sampling clock pulse CLK is generated.

The operation stage call state machine corresponding to each mode has a function of sequentially starting the operation state machines corresponding to one or a plurality of arithmetical operations forming the signal processing in order to cause the data path unit 30 to perform the signal processing in the mode. The operation state machine started by the operation stage call state machine generates a control signal to cause the data path unit 30 to perform the relevant arithmetical operation. This control signal is supplied to the data path unit 30 via the operation stage call state machine.

Moreover, the operation stage call state machine makes a control to deliver data appropriately between the respective arithmetical operations forming the signal processing. As shown in FIG. 3, an embodiment of delivering data between the arithmetical operations forming the signal processing depends upon the mode. For example, focusing on the MIX operation, a result of the VOL operation and a result of the LOAD operation are delivered to the MIX operation in the mode 0, while a result of the VOL operation and a result of the EQ operation are delivered to the MIX operation in the mode 1. Furthermore, a result of the MIX operation is delivered to the EQ operation in the mode 0, while a result of the MIX operation is delivered to the VSP operation in the mode 1. Therefore, in this embodiment, when a control signal for causing the data path unit 30 to perform an arithmetical operation is sent to the data path unit 30, the operation stage call state machine corresponding to each mode sends the control signal including information indicating a location of target data of the arithmetical operation and information indicating a storage location or an output destination of a result of the arithmetical operation to the data path unit 30. This control enables settings of a location from which input data for each arithmetical operation is acquired and a location to which output data is supplied for each mode so as to cause the data path circuit having an identical configuration to perform various signal processing.

The state machine unit 40 has a state machine 43 and a main state machine 44 for totally controlling all of the state machines in the state machine unit 40 in addition to the aforementioned state machines. The state machine 43 is started up by the main state machine 44 when the mode information in the mode register 50 is updated and initializes the memory for storing temporary data 31. It is because, if the mode is switched, a result of the arithmetical operation in the mode before switching remaining in the memory for storing temporary data 31 may affect an arithmetical operation in a mode after the switching. For example, in an arithmetical operation involving delay processing like the VSP operation, unless the memory for storing temporary data 31 is initialized at the time of mode switching, a result of the arithmetical operation in the mode before switching is delivered to an arithmetical operation after the switching, which leads to an unsuccessful result, instead of an intended one. In order to prevent the disadvantage, the state machine 43 is started at the time of mode switching.

An analog unit 60 in FIG. 1 mainly comprises a D/A converter, which converts digital signals of the two channels L and R output from the aforementioned audio signal processing unit 20 to analog signals respectively and outputs them to left and right speakers (not shown in FIG. 1).

The details of the configuration of the audio signal processor 10 according to this embodiment have been described hereinabove.

Subsequently, an operation according to this embodiment will be described below. While the audio data of the two channels L and R is to be processed by the data path unit 30 in the operation described hereinafter, it is simply referred to as "audio data" to simplify the explanation.

When audio data from the source A and performance data from the source B are supplied to the audio signal processor 10 in FIG. 1, audio data A of sampling frequency f1 is output from the digital audio I/F 11, audio data B of sampling frequency f2 is output from the sound source 14, and they are supplied to the audio signal processing unit 20.

Figure 4:
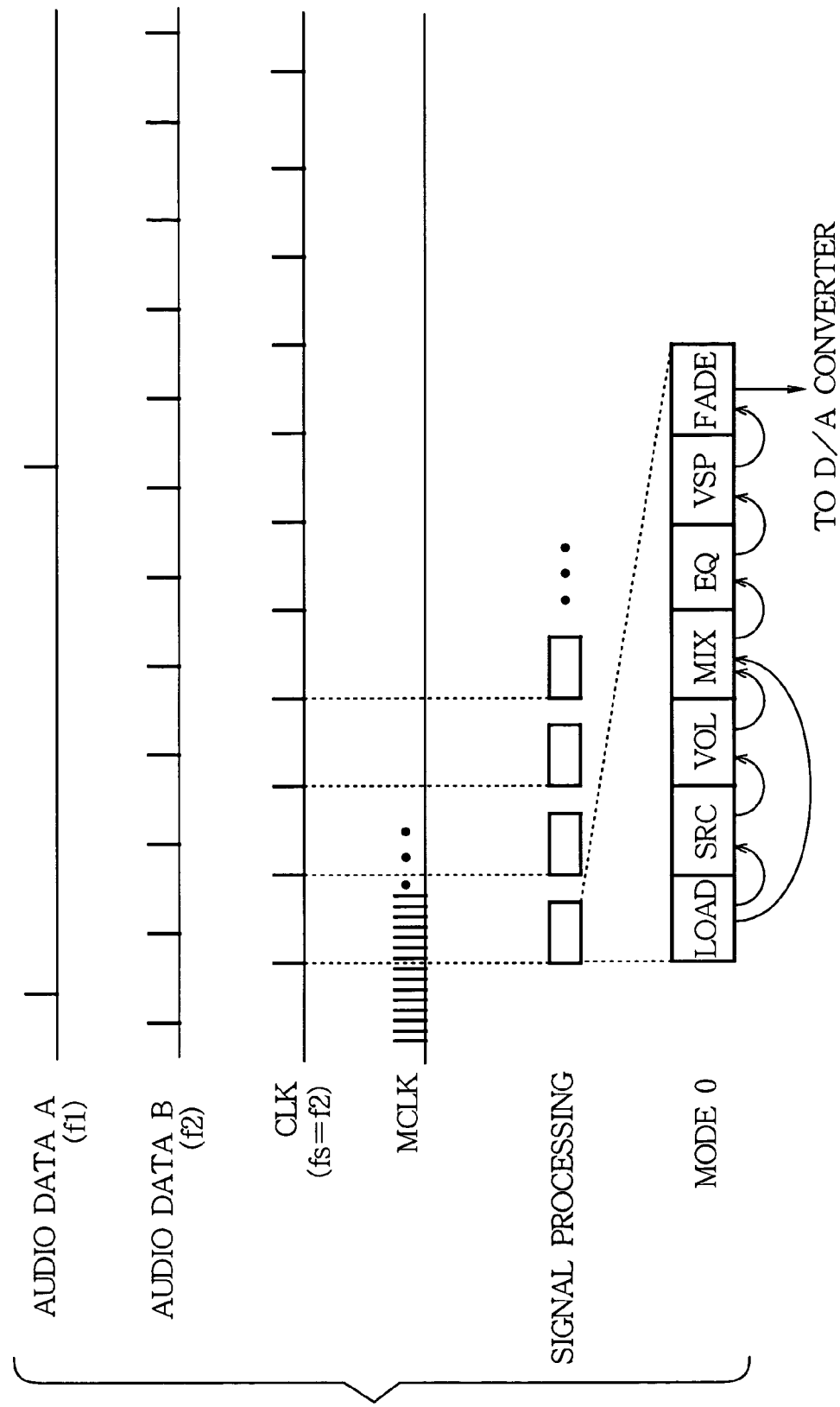
FIG. 4 is a timing chart showing an operation of the first embodiment.

Referring to FIG. 4, there is shown a timing chart showing an operation of the audio signal processing unit 20 for processing these audio data. Inside the audio signal processing unit 20, there are generated sampling clock pulses CLK of frequency fs and operation clock pulses MCLK faster than this. The audio data A and B are output from the digital audio I/F 11 and the sound source 14 respectively at timings asynchronous to these clock pulses, and they are stored in a buffering area for the audio data A and a buffering area for the audio data B in the memory for storing temporary data 31 respectively. In this embodiment, these buffering areas work as FIFO areas. In other words, the audio data A and B to be read, having been stored in the buffering areas, are read from the oldest one sequentially.

In the audio signal processing unit 20, signal processing for the audio data A and B is performed every time a sampling clock pulse CLK is generated. More specifically, if a mode indicated by the mode information in the mode register 50 is, for example, mode 0, the audio signal processing unit 20 sequentially performs a LOAD operation, an SRC operation, a VOL operation, an MIX operation, an EQ operation, a VSP operation, and FADE operation, which form signal processing of the mode 0, with a time sharing control every time a sampling clock pulse CLK is generated as shown.

Figure 5:
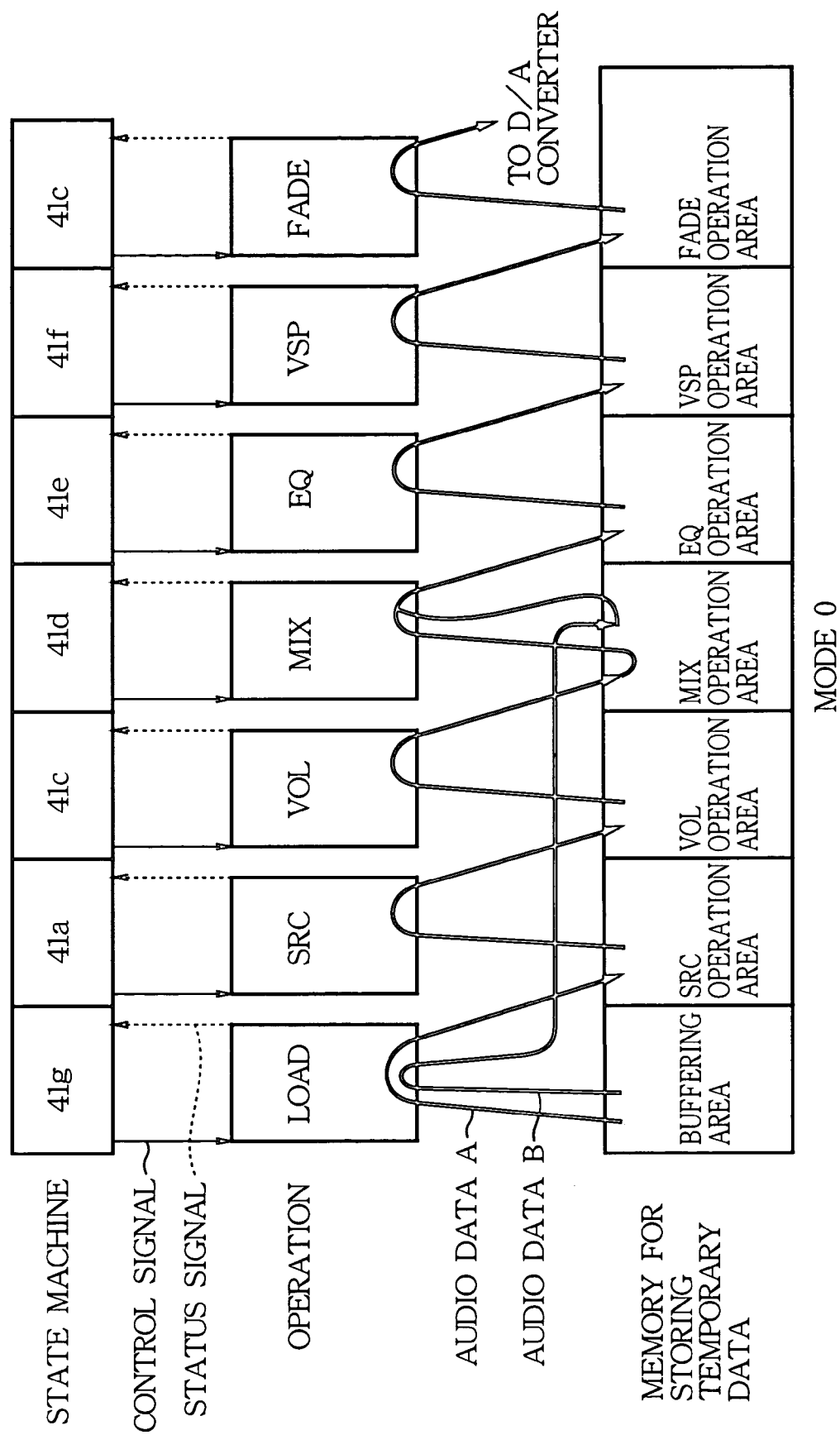
FIG. 5 is a timing chart showing an operation of the first embodiment.

FIG. 5 illustrates a timing chart showing the signal processing corresponding to the performed by the audio signal processing unit 20 at a certain sampling frequency (1/fs). In the mode 0, the operation stage call state machine corresponding to the in the operation stage call state machine unit 42 is started being triggered by a rising edge of the sampling clock pulse CLK. The operation stage call state machine corresponding to the starts up the operation state machine 41g for the LOAD operation, first. The operation state machine 41g generates a control signal for causing the data path unit 30 to perform the LOAD operation. This control signal is sent to the data path unit 30 via the operation stage call state machine corresponding to the mode 0. At the same time, the operation stage call state machine corresponding to the sends a control signal including information indicating a storage area for the oldest data in the audio data B to be read and information specifying the MIX operation area in the memory for storing temporary data 31, which is an output destination of the audio data B, to the data path unit 30. Furthermore, in a state where the SRC operation requires a supplement of the audio data A, the operation stage call state machine corresponding to the sends a control signal including information indicating a storage area for the audio data A to be read in the LOAD operation and information specifying the SRC operation area in the memory for storing temporary data 31 as an output destination of the audio data A to the data path unit 30. It will be described later what state corresponds to the state where the SRC operation requires a supplement of the audio data A.

In the data path unit 30, the LOAD operation is performed according to the control signal sent from the state machine unit 40 as mentioned above. More specifically, the operation coefficient generation circuit 35 gives "1" as an operation coefficient to the multiplier 33, first. The accumulator 34 is put into a through state. In this state, the audio data B is read from the buffering area for the audio data B in the memory for storing temporary data 31. The audio data B passes by the multiplier 33 and the accumulator 34 and is stored in an MIX operation area in the memory for storing temporary data 31. In the state where the SRC operation requires a supplement of the audio data A, the audio data A is read from the buffering area for the audio data A in the memory for storing temporary data 31. This audio data A passes by the multiplier 33 and the accumulator 34 and is stored in an SRC operation area in the memory for storing temporary data 31. When the LOAD operation ends in this manner, the data path unit 30 sends a status signal indicating the end of the LOAD operation to the state machine unit 40.

Upon receiving this status signal, the operation stage call state machine corresponding to the starts up the operation state machine 41a for the SRC operation. The operation state machine 41a generates a control signal for causing the data path unit 30 to perform the SRC operation. This control signal will be described later in detail. The control signal for the SRC operation is sent to the data path unit 30 via the operation stage call state machine corresponding to the mode 0. At the same time, the operation stage call state machine corresponding to the sends a control signal including information specifying the SRC operation area in the memory for storing temporary data 31 as a storage location of input data to be a target of the SRC operation and information specifying the VOL operation area in the memory for storing temporary data 31 as an output destination of the audio data after the sampling rate conversion to the data path unit 30.

Figure 6:
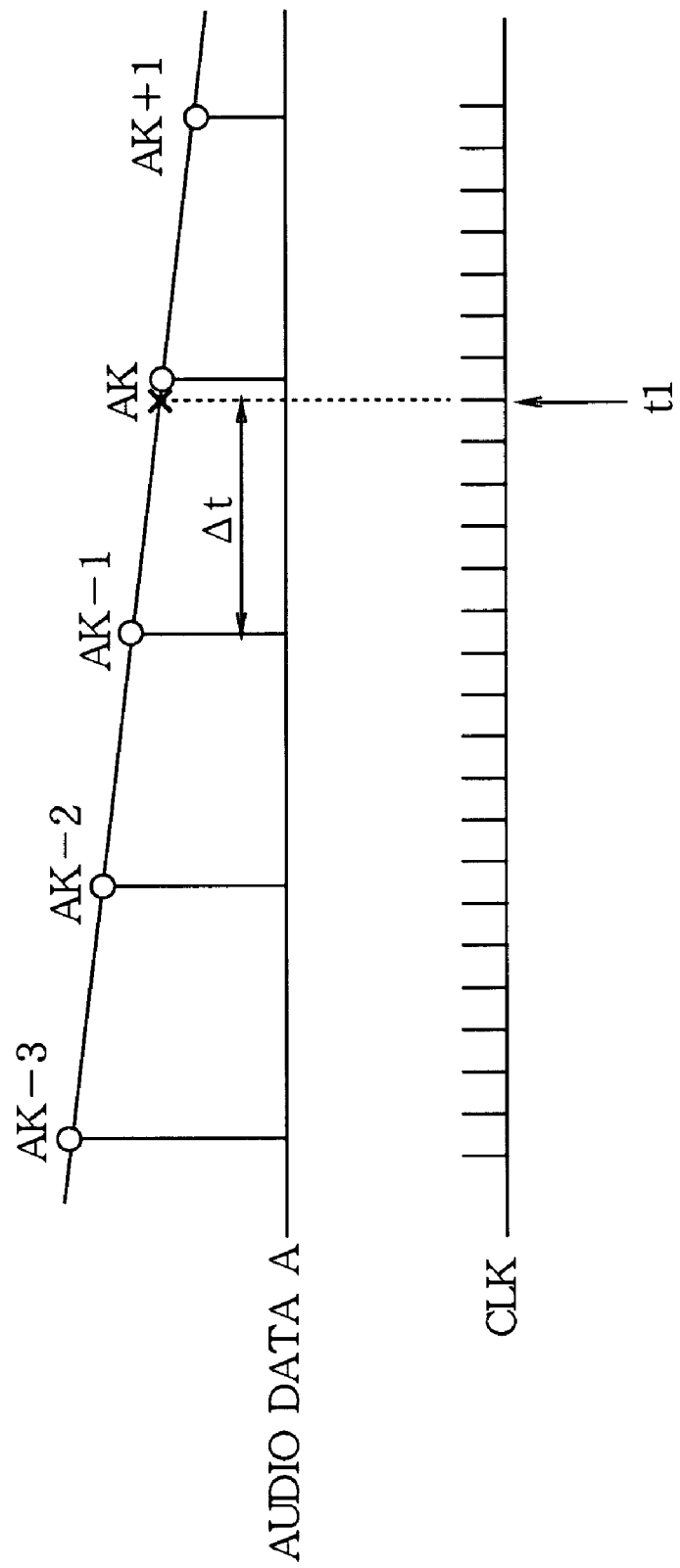
FIG. 6 is a timing chart showing an SRC operation performed in the first embodiment.

In the data path unit 30, the SRC operation is performed based on the control signal sent from the state machine unit 40 in this manner. FIG. 6 shows a situation of the SRC operation. In the SRC operation, an interpolating operation is performed to obtain a single instantaneous value of the audio waveform at respective sampling points arranged at 1/fs intervals on an envelope of a series of audio data A generated in the past, every time a sampling clock pulse CLK of the frequency fs is generated. In FIG. 6, an instantaneous value obtained at a generation of the sampling clock pulse CLK is indicated by mark X at time t1. This instantaneous value is obtained by convoluting interpolating operation coefficient strings with a given number of audio data A around the sampling point. FIG. 6 shows an example of obtaining an instantaneous value at the sampling point by using single voice data Ak following the sampling point and three audio data Ak−1, Ak−2, and Ak−3 preceding the sampling point. Phase information Δt indicates a phase difference between a sampling point at which an instantaneous value should be obtained and a generation timing of the audio data Ak−1 immediately preceding the sampling point. The aforementioned control signal for the SRC operation includes the phase information Δt. The operation coefficient generation circuit 35 generates predetermined interpolating operation coefficient strings corresponding to the phase information Δt and sequentially supplies the interpolating operation coefficients to the multiplier 33. Simultaneously with this operation, the audio data Ak to Ak−3 are read from the SRC operation area of the memory for storing temporary data 31 and sequentially supplied to the multiplier 33. The multiplier 33 sequentially multiplies the audio data Ak to Ak−3 by the interpolating operation coefficients respectively and the accumulator 34 accumulates results of the multiplication. In this manner, the interpolating operation coefficient strings are convoluted with the audio data Ak to Ak−3. Then, the instantaneous value of the audio waveform corresponding to the sampling point at the time t1 obtained by the convolutional operation is written into the VOL operation area in the memory for storing temporary data 31 as audio data A after the SRC operation.

Subsequently, the data path unit 30 obtains phase information Δt corresponding to a sampling point subsequent to the sampling point at which the current instantaneous value is obtained and sends it as a status signal to the state machine unit 40. This phase information Δt is to be sent as a part of the control signal from the state machine unit 40 to the data path unit 30 in the subsequent SRC operation. Phase information Δt corresponding to the new sampling point can be obtained by causing the operation unit 32 to perform, for example, processing of adding the frequency ratio f1/fs to the current phase information Δt.

If the phase information Δt exceeds "1" by the addition of the frequency ratio f1/fs, an instantaneous value of the audio waveform to be obtained next is for a time point later than the newest audio data Ak in the SRC operation area. In this situation, the subsequent SRC operation requires a supplement of new audio data Ak+1 and a use of the audio data Ak+1, Ak, Ak−1, and Ak−2. Accordingly, the data path unit 30 sends a status signal, which includes phase information Δt obtained by subtracting "1" from phase information Δt obtained after the addition of the frequency ratio f1/fs and information indicating that it is necessary to add the audio data Ak+1 in the next sampling period, to the state machine unit 40.

In the operation stage call state machine corresponding to the mode 0 in the operation stage call state machine unit 42, the status signal received from the data path unit 30 is stored for the subsequent SRC operation. In some cases, the status signal from the data path unit 30 includes information indicating a need for a supplement of new audio data A. In these cases, when the data path unit 30 is made to perform the LOAD operation in the subsequent sampling period, the operation stage call state machine corresponding to the sends the control signal including information indicating the audio data A storage area and information specifying the SRC operation area in the memory for storing temporary data 31 as an output destination of the audio data A to the data path unit 30 as described above.

The above is the detail of the SRC operation performed by the audio signal processing unit 20.

The sampling frequency f1 of the actual audio data A has a time jitter, and the frequency fs of the sampling clock pulse CLK has a time jitter, too. If phase information Δt is calculated by accumulating fixed values f1/fs as described above when these time jitters are significant, a phase difference between a phase of an instantaneous value of the audio waveform calculated by the SRC operation and a phase of audio data A written into the buffering area for the audio data A increases with time. Thereby, there is a possibility of an occurrence of an overflow or an underflow of the buffering area. To prevent this disadvantage, it is preferable to monitor a remaining amount of audio data A, which has not been read out yet, in the buffering area: if the remaining amount is less than a given value, an increment to be added to the phase information Δt for each sampling period is decreased to prevent the underflow, or if the remaining amount is more than the given value, the increment to be added to the phase information Δt is increased to prevent the overflow. This technology is disclosed in, for example, Patent Document 3 whose patent has been applied by the present applicant.

Patent Document 3 is Japanese Laid-Open Patent Publication (Kokai) No. H11(1999)-55075.

Upon detecting an end of the SRC operation by means of the status signal from the data path unit 30, the operation stage call state machine corresponding to the in the operation stage call state machine unit 42 starts up the operation state machine 41c for the VOL operation. The operation state machine 41c generates a control signal for use in causing the data path unit 30 to perform the VOL operation. This control signal is sent to the data path unit 30 via the operation stage call state machine corresponding to the mode 0. At the same time, the operation stage call state machine corresponding to the mode 0 sends a control signal including information indicating a location of the input data to be a target of the VOL operation and information specifying the MIX operation area in the memory for storing temporary data 31 as an output destination of audio data obtained as a result of the VOL operation to the data path unit 30.

The data path unit 30 performs the VOL operation as described below according to the control signal sent from the state machine unit 40 as described above. First, the audio data A after the SRC operation is read from the VOL operation area in the memory for storing temporary data 31. Then, the operation unit 32 performs the VOL operation for the audio data, and audio data obtained as a result is stored in the MIX operation area in the memory for storing temporary data 31.

When the VOL operation ends in this manner, the data path unit 30 sends a status signal indicating this to the state machine unit 40.

Upon detecting the end of the VOL operation by means of the status signal from the data path unit 30, the operation stage call state machine corresponding to the mode 0 in the operation stage call state machine unit 42 starts up the operation state machine 41d for the MIX operation. The operation state machine 41d generates a control signal for causing the data path unit 30 to perform the MIX operation. This control signal is sent to the data path unit 30 via the operation stage call state machine corresponding to the mode 0. At the same time, the operation stage call state machine corresponding to the mode 0 sends a control signal including information indicating a location of the input data to be a target of the MIX operation and information specifying the EQ operation area in the memory for storing temporary data 31 as an output destination of audio data obtained as a result of the MIX operation to the data path unit 30.

The data path unit 30 performs the MIX operation according to the control signal sent from the state machine unit 40 as described above. The MIX operation is intended for the audio data A and B stored in the MIX operation area in the memory for storing temporary data 31. In this regard, the audio data A has been submitted to the above SRC operation and thus becomes sample data of the sampling frequency f2 like the audio data B. Therefore, in the MIX operation, it is only necessary to perform a summation of weights of these audio data. Hereinafter, the operation will be described.

First, the audio data A is read from the MIX operation area and a mixing coefficient defining a weight of the audio data A is output from the operation coefficient generation circuit 35, and then they are supplied to the multiplier 33. The multiplier 33 multiplies the audio data A by the mixing coefficient. A result of the multiplication is supplied to and stored in the accumulator 34. Subsequently, the audio data B is read from the MIX operation area in the memory for storing temporary data 31 and a mixing coefficient defining a weight of the audio data B is output from the operation coefficient generation circuit 35, and then they are supplied to the multiplier 33. The multiplier 33 multiplies the audio data B by the mixing coefficient. A result of the multiplication is supplied to the accumulator 34. The multiplier 34 performs accumulating processing in which the result of the multiplication is added to data that has already been stored. This accumulating processing produces audio data made of the audio data A and B mixed. The audio data after the mixing operation is stored into the EQ operation area in the memory for storing temporary data 31. Upon an end of the mixing operation in this manner, the data path unit 30 sends a status signal indicating it to the state machine unit 40.

Hereinafter, the VSP operation and the FADE operation will be performed basically under the same control as for the above.

During execution of the last FADE operation, the operation stage call state machine corresponding to the mode 0 sends information specifying the analog unit 60 as an output destination of a result of the FADE operation to the data path unit 30. The data path unit 30 sends a result of the FADE operation to the analog unit 60 according to this information.

Upon an end of the last FADE operation, the audio signal processing unit 20 enters an IDLE state. In the IDLE state, the data path unit 30 does not perform any operation for signal processing, thereby holding down the entire power consumption of the audio signal processor 10 to a low level.

Thereafter, when a sampling clock pulse CLK is generated and thereby a new sampling period is started, the signal processing of the mode 0 from the LOAD operation to the FADE operation is performed again as shown in FIG. 4.

The above processing is repeated whenever the sampling clock pulse CLK is generated, by which the analog signal after the signal processing in the mode 0 shown in FIG. 3 is generated in the analog unit 60 and it is output as a sound from the left and right speakers.

Figure 7:
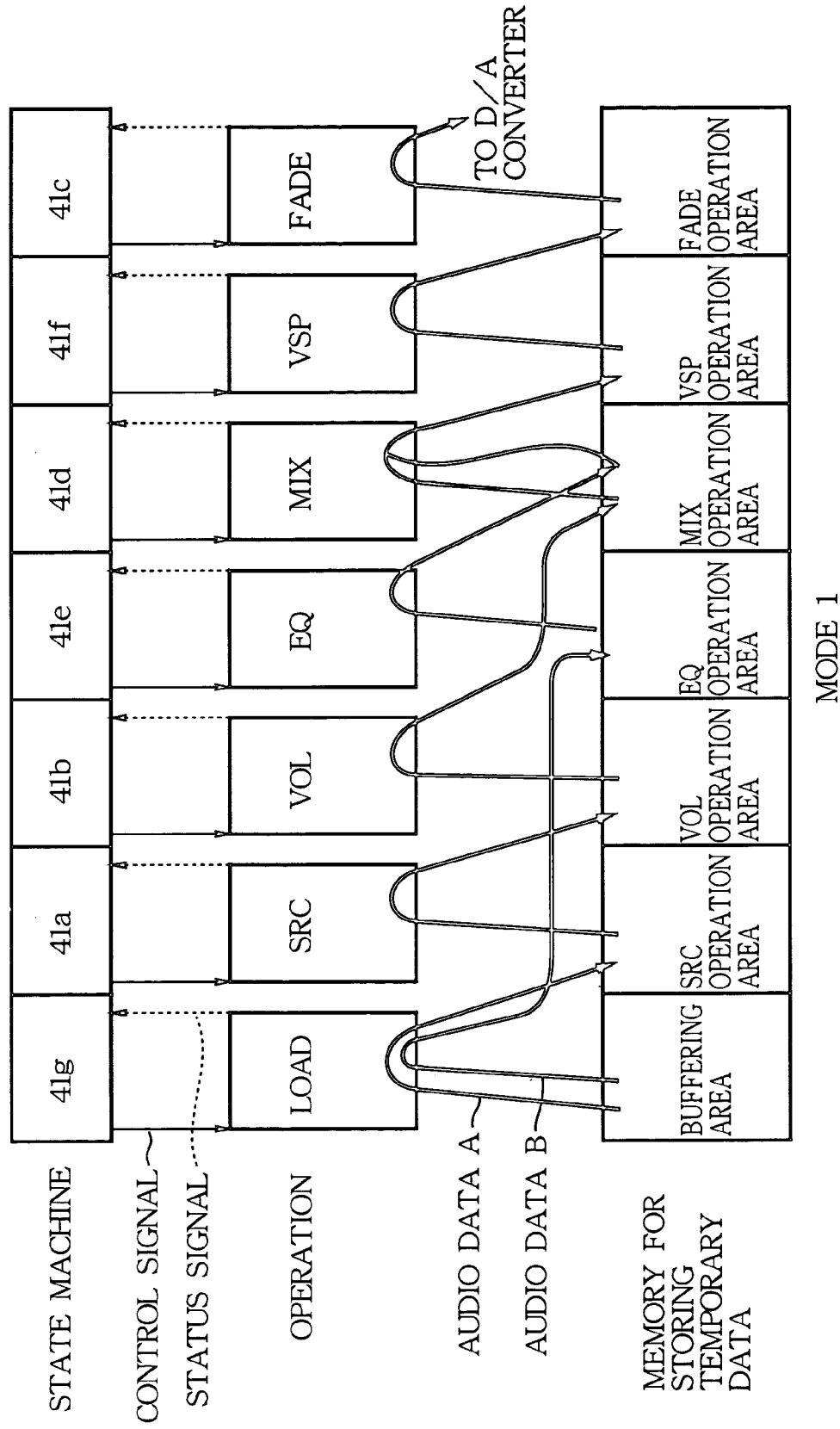
FIG. 7 is a timing chart showing an operation of the first embodiment.

Also when the mode information specifying another mode is stored in the mode register 50, the signal processing in that mode is performed by the same control as for the above. FIG. 7 illustrates an operation of the audio signal processing unit 20 when performing the signal processing in the mode 1 shown in FIG. 3. Comparing FIG. 7 with FIG. 5, the MIX operation area and the EQ operation area are exchanged in places with each other. It should be noted, however, that they are arranged as shown to avoid a complicated drawing, but it does not mean that the MIX operation area and the EQ operation area are replaced by each other actually.

In the aforementioned signal processing in the mode 0, the LOAD, SRC, VOL, MIX, EQ, VSP, and FADE operations have been started in this order by working of the operation stage call state machine corresponding to the mode 0. On the other hand, in the signal processing in the mode 1, the LOAD, SRC, VOL, EQ, MIX, VSP, and FADE operations are started in this order by working of the operation stage call state machine corresponding to the mode 1. Moreover, data delivery between the operations is conducted in a different form from that of the mode 0 by working of the operation stage call state machine corresponding to the mode 1.

As stated hereinabove, the audio signal processor 10 according to this embodiment is capable of perform a plurality of types of signal processing whose contents are different from each other by using a common data path unit 30. Furthermore, by previously writing mode information corresponding to desired signal processing into the mode register 50, the audio signal processing unit 20 can be caused to perform the signal processing. Therefore, it is possible to achieve the audio signal processor 10 conforming to a lot of specifications different in types of signal processing by using a single chip. In the audio signal processor 10 according to this embodiment, there is an idle state in which the data path unit 30 does not operate at all during a period from a start of a sampling period to the next sampling period after an execution of the signal processing corresponding to the mode information. Moreover, in the signal processing corresponding to the mode information, the data path unit 30 performs an operation only for the signal processing. Therefore, according to this embodiment, unnecessary operations for the signal processing are avoided, thereby eliminating wasteful power consumption and achieving low power consumption. Therefore, the audio signal processor can be mounted onto a portable electronic device required to be low in power consumption such as, for example, a mobile telephone. Thereby, it becomes possible to provide these devices with high-quality audio signal processing functions.

Second Embodiment

Figure 9:
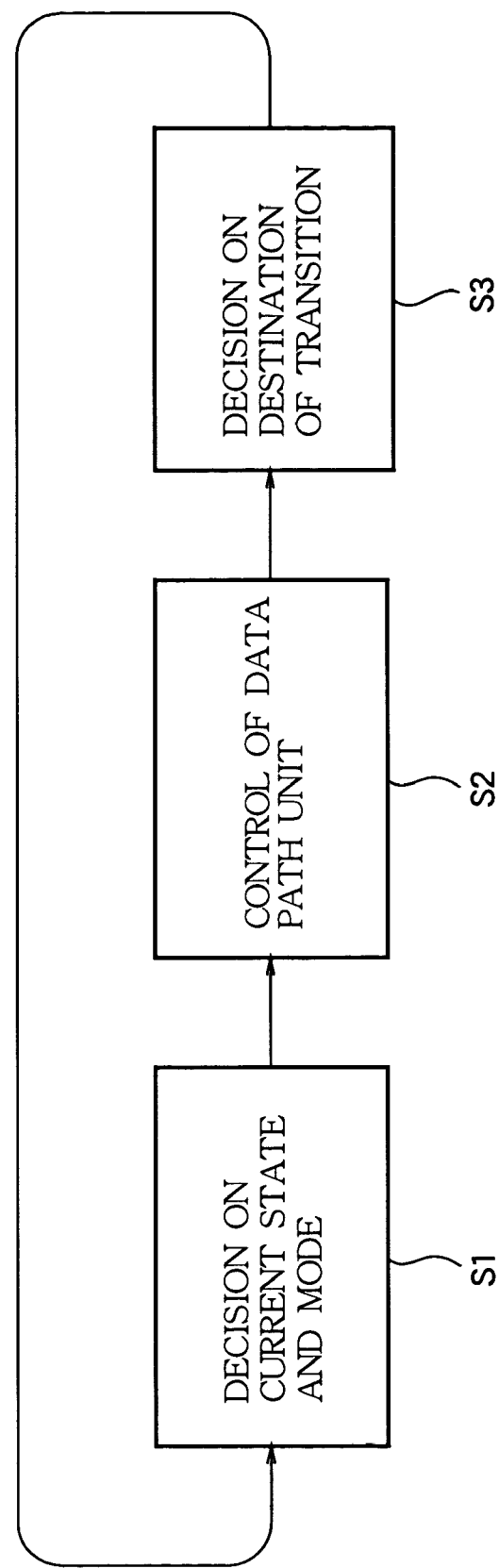
FIG. 9 is a state transition diagram showing an operation of the second embodiment.

A configuration of an audio signal processor according to this embodiment is basically the same as that in the first embodiment shown in FIG. 1. In the above first embodiment, the operation stage call state machine unit 42 has been an assembly of the plurality of operation calling state machines corresponding to the mode 0 to mode n−1. An operation stage call state machine unit 42 in this embodiment is a single state machine, which controls a data path unit 30 and carries out a state transition according to a decision table shown in FIG. 8. FIG. 9 illustrates a state transition diagram showing the operation.

As shown in FIG. 9, the operation stage call state machine unit 42 determines a content of a control of the data path unit 30 based on the current state and mode (steps S1 and S2). For example, currently if it is to control the SRC operation of the data path unit 30 and the mode 0 is applied, the operation stage call state machine unit 42 sends a control signal specifying the SRC operation to the data path unit 30. At the same time, the operation stage call state machine unit 42 sends a control signal specifying a VOL operation area as an output destination of data obtained by the SRC operation according to the decision table in FIG. 8 to the data path unit 30. Then, upon detecting an end of the SRC operation by means of a status signal from the data path unit 30, the operation stage call state machine unit 42 transits to a state for controlling the VOL operation according to the decision table in FIG. 8 (step S3). Thereafter, in a state for controlling the VOL operation, it controls the data path unit 30 based on the current state (in this case, a state for controlling the VOL operation) and mode again (steps S1 and S2).

In this embodiment, the same effect as in the above first embodiment is achieved, too.

(Other Expedients)

While the first embodiment and the second embodiment of the present invention have been described hereinabove, the present invention further has the following expedients:

(1) Allocation of areas in the memory for storing temporary data for use in the arithmetical operations may depend on the mode. For example, it is possible to allocate larger areas to individual arithmetical operations in a mode where only a few types of the arithmetical operations will be performed than in a mode where the number of types of arithmetical operations to be performed is greater than this.

(2) Unless the mode switching is dynamically performed, the state machine 43 for initialization of the memory for storing temporary data and the main state machine 44 are unnecessary. Therefore, they can be omitted in this situation.

Third Embodiment

A third embodiment of the present invention will now be described hereinafter with reference to drawings.

Figure 10:
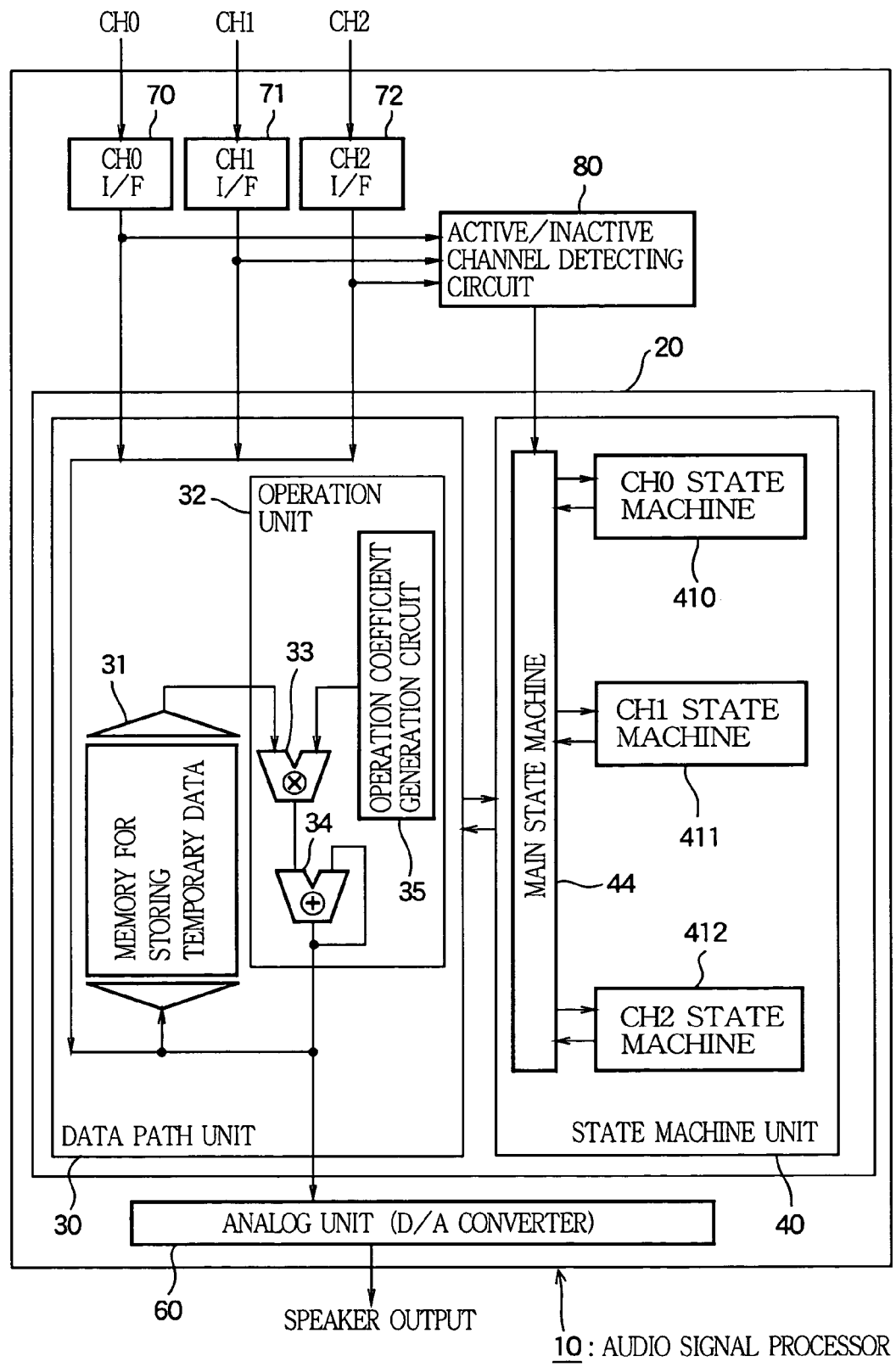
FIG. 10 is a block diagram showing a configuration of an audio signal processor of a third embodiment of the present invention.

FIG. 10 illustrates a block diagram showing a configuration of an audio signal processor 10 according to the third embodiment of the present invention. The audio signal processor 10 is an LSI comprising a circuit equivalent to shown components formed on a semiconductor chip, and it is mounted on various audio equipment requiring an effector function, a mixing function, and other functions.

The audio signal processor 10 according to this embodiment has a CH0 interface 70 corresponding to a channel 0, a CH1 interface 71 corresponding to a channel 1, and a CH2 interface 72 corresponding to a channel 2 as interfaces for inputting audio data into the processor. These interfaces 70 to 72 may receive data output from the same source or may receive data output from different sources. Also, these interfaces 70 to 72 may treat data in the same format or may treat data in different formats. For example, there can be a mode such that a certain interface receives and outputs audio data, which is sample data of an audio waveform, while other interfaces receive MIDI or other performance data and generate and output audio data based on it.

An active/inactive channel detecting circuit 80 detects whether the respective channels are active or inactive from the audio data input via the interfaces 70 to 72 of the channels and outputs channel status signals indicating the results.

In this regard, the active/inactive channel detecting circuit 80 does not determine that the channel becomes inactive immediately after an input of audio data indicating a silence, but determines that the channel becomes inactive if a condition where no audio data is input continues for a preset given period of time after an input of audio data indicating a silence. It is because, if the channel status signal indicating an inactive state is immediately output, there is a possibility of interrupting signal processing under execution for audio data that has already been input in the previous sampling period. It will be described later how long period should be set as an indication for determining the inactive state most preferably. In the above embodiment, the channel status signal is generated by detecting that the audio data is not inputted into the channel. Alternatively, the input audio data itself may contain status information indicating the state of the corresponding channel.

An audio signal processing unit 20 performs signal processing for the audio data input via the interfaces 70 to 72 and outputs digital signals of two channels L and R as a result of the processing. An analog unit 60, which comprises mainly a D/A converter, converts the digital signals of the two channels L and R output from the audio signal processing unit 20 to analog signals and outputs them to left and right speakers (not shown).

As shown in FIG. 10, the audio signal processing unit 20 has a data path unit 30 and a state machine unit 40. The data path unit 30 has a memory for storing temporary data 31 and an operation unit 32.

The memory for storing temporary data 31 is used as a temporary storage area for use in temporarily storing audio data to be processed and digital data under signal processing. In this regard, signal processing performed by the audio signal processor 10 includes signal processing of a so-called delay system, and therefore the memory for storing temporary data 31 has a secured FIFO (first-in first-out) memory having a storage area for storing n pieces of audio data. The number of audio data that can be stored in the FIFO, "n" is preset according to a ratio of the longest delay time to a sampling period.

As stated above, the active/inactive channel detecting circuit 80 determines the inactive state only if the condition where no audio data is input continues for the given period of time after the input of audio data indicating a silence. It is most preferable that the period as an indication for determining the inactive state is set to be longer than the longest delay time mentioned above. In signal processing of a delay system such as giving reverberation, a specific area of the memory for storing temporary data 31 is used as a FIFO for delaying audio data to shift the audio data in the FIFO sequentially to a backward storage area every time a sampling period elapses, while operations are sequentially performed by using the audio data in the FIFO. Therefore, even if an input of audio data stops, a certain time lag occurs until an end of the entire signal processing. Accordingly, the period for determining the inactive state is set to end a little later than the time when all audio data in the memory for storing temporary data 31 is cleared. Thereby, it becomes possible to prevent a situation in which signal processing for already input audio data is interrupted.

The operation unit 32 is a device for performing an arithmetical operation for data read from the memory for storing temporary data 31, having a multiplier 33, an accumulator 34, and an operation coefficient generation circuit 35. In this regard, the multiplier 33 is a circuit for multiplying data read from the memory for storing temporary data 31 by an operation coefficient, and the operation coefficient generation circuit 35 is for generating the operation coefficient. The accumulator 34 is a circuit for accumulating a result of the multiplication every time the result is output from the multiplier 33. All of the following are determined according to control signals supplied from the state machine unit 40 (more specifically, a state machine for an arithmetical operation concerned): what operation coefficient should be generated by the operation coefficient generation circuit 35; what operations should be performed by the multiplier 33 and the accumulator 34; which area data in the memory for storing temporary data 31 should be a target of the arithmetical operation; and to which the operation result should be output.

The state machine unit 40 is a device for making controls for state transitions of the data path unit 30. The state machine unit 40 is supplied with a status signal indicating an internal state of the data path unit 30 and monitors a change in the internal state of the data path unit 30 based on the status signal. Then, the state machine unit 40 outputs a control signal based on a result of the monitoring to the data path unit 30 in order to cause the data path unit 30 to perform various signal processing.

As shown in FIG. 10, the state machine unit 40 has operation state machines 410 to 412 corresponding to the channels 0 to 2 respectively and a main state machine 44 for totally controlling these operation state machines. In this regard, the operation state machines 410 to 412 are state machines for controlling the data path unit 30 so that it performs the signal processing of respective audio data of the channels 0 to 2. More specifically, upon being started by the main state machine 44, the operation state machines 410 to 412 sequentially output a series of control signals, which specify an operation coefficient to be generated by the operation coefficient generation circuit 35, an address of the memory for storing temporary data 31 storing data to be a target of the operation, contents of the operations performed by the multiplier 33 and the accumulator, and an output destination of the operation result, in a preset procedure. The series of signals are sequentially output in synchronization with the main clock pulses generated inside the audio signal processing unit 20.

The main state machine 44 sequentially starts up the operation state machines 410 to 412 in a given order in respective sampling periods. Note that, however, if a channel status signal indicating that a specific channel becomes inactive is output from the active/inactive channel detecting circuit 80 in a certain sampling period, the main state machine 44 skips a start-up of the operation state machine corresponding to the channel and shifts the state machine unit 40 to the next state in the next sampling period. The skip operation of the control of the signal processing corresponding to the inactive channel is repeated until an output of a channel status signal indicating that the channel returns to the active state.

Figure 11:
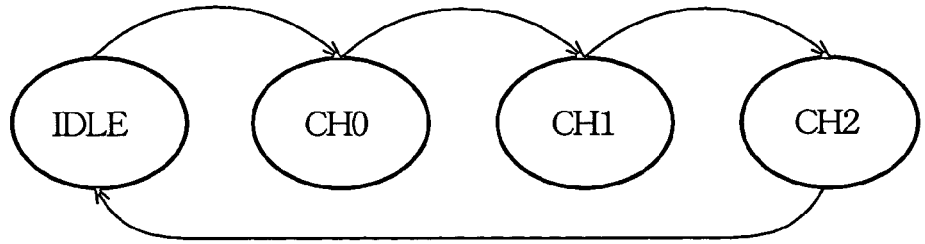
FIGS. 11(a) and 11(b) are a diagram showing a state transition of the audio signal processor.
Figure 11:
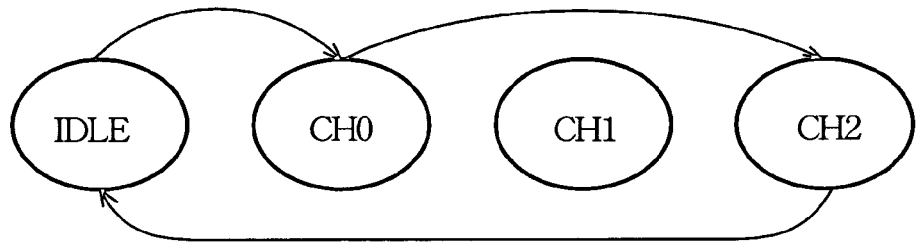
Figure 12:
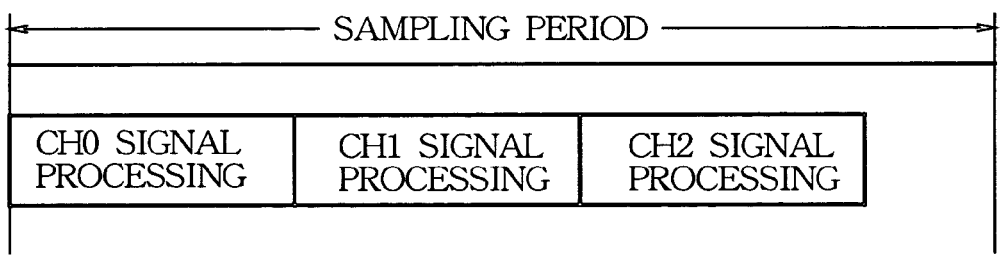
FIGS. 12(a) and 12(b) are a diagram showing behaviors of an operation unit in the audio signal processor.
Figure 12:
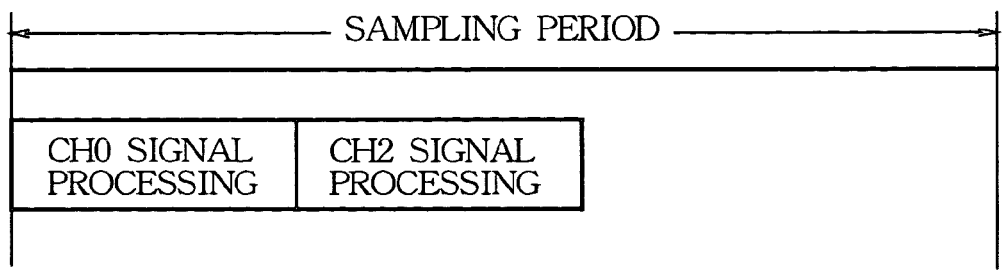
Figure 13:
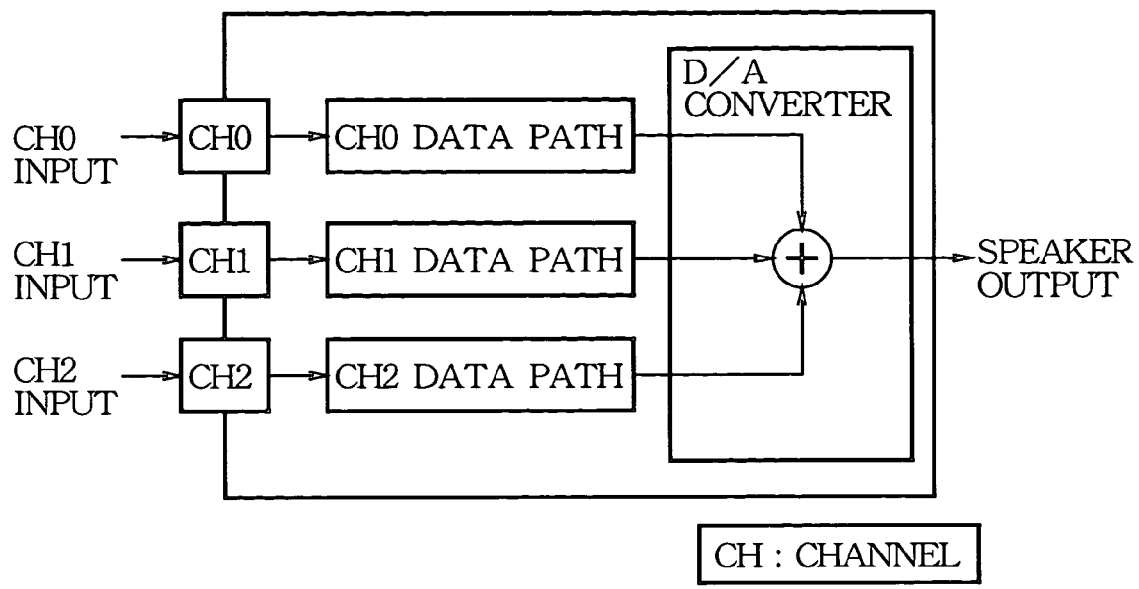
FIG. 13 is a diagram showing a circuitry of a conventional technology.
Figure 14:
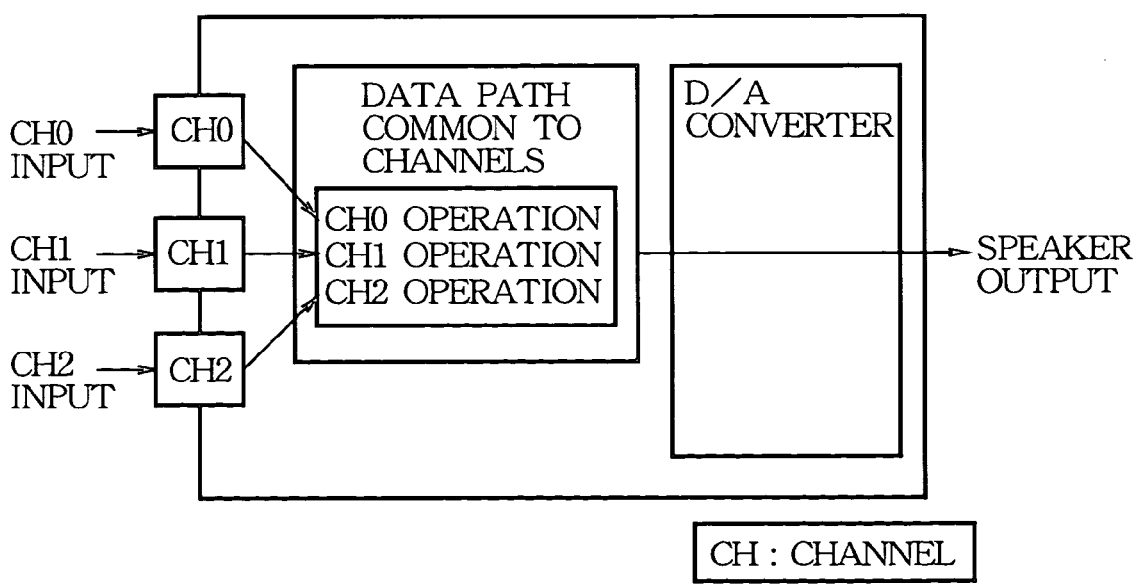
FIG. 14 is a diagram showing a circuitry of a conventional technology.

A relation between the state transition of the state machine unit 40 and processing of the operation unit 32 will be described with reference to FIG. 11 and FIG. 12. FIG. 11(a) illustrates a diagram showing a state transition of the state machine unit 40 in a sampling period in which all channels are active. FIG. 11(b) is a diagram showing a state transition of the main state machine 44 in a sampling period in which the channel 1 is inactive. In these diagrams, "CH0" indicates a state in which the operation state machine 410 is controlling the data path unit 30 so as to achieve signal processing of audio data of the channel 0. "CH1" indicates a state in which the operation state machine 411 is controlling the data path unit 30 so as to achieve signal processing of audio data of the channel 1. "CH2" indicates a state in which the operation state machine 412 is controlling the data path unit 30 so as to achieve signal processing of audio data of the channel 2. Furthermore, "IDLE" indicates a state in which no operation state machine is started and no signal processing is under execution in the data path unit 30.

If all channels are active, the state machine unit 40 shifts from the "IDLE" state to the "CH0" state due to a start of the sampling period and then shifts from "CH1" to "CH2" and returns to the "IDLE" state, as shown in FIG. 11(a). Therefore, in this sampling period, signal processing for all sample data of CH0, CH1, and CH2 is performed as shown in FIG. 12(a).

If the channel 1 is inactive, the "CH1" state is skipped in the state transition of the state machine unit 40 as shown in FIG. 11(b). Therefore, the state shifts in the following order: "IDLE," "CH0," and "CH2." It then returns to "IDLE." Accordingly, in this sampling period, signal processing for audio data of the channel 0 and the channel 2 is performed, while signal processing for audio data of the channel 1 is not performed as shown in FIG. 12(b). Thus, due to the skip of the signal processing for the audio data of the channel 1, a longer "IDLE" state period is obtained, thereby reducing the power consumption.

The same is true in a case where a channel status signal indicating that the channel 0 or the channel 2 becomes inactive is output from the active/inactive channel detecting circuit 80. If so, the main state machine 44 skips a start-up of the operation state machine corresponding to the inactive channel. Thereby, the arithmetical operation of the inactive channel need not be performed, thus reducing power consumption necessary for the signal processing operation. Accordingly, it becomes possible to mount the processor on a portable electronic device required to be low in power consumption such as, for example, a mobile phone, and thus possible to provide these devices with high-quality audio signal processing functions.

Fourth Embodiment

In the third embodiment, if audio data of a channel continuously stops for a given or longer period of time, an execution of signal processing of the relevant channel is stopped. On the other hand, in this embodiment, the following operation is performed. First, the active/inactive channel detecting circuit 80 outputs a first channel status signal if an input of audio data indicating a silence continues for more than a first time period regarding a certain channel. If an input of audio data indicating a silence continues for more than a second time period longer than the first time period regarding the channel, the active/inactive channel detecting circuit 80 outputs a second channel status signal. The second time period is the same as the duration of a silence for determining that the channel becomes inactive in the third embodiment stated above. In the same manner as for the third embodiment, the operation state machines 410 to 412 of the state machine unit 40 skip signal processing according to the channel status signals. The skip operation, however, is performed in different modes according to whether the first channel status signal is output or the second channel status signal is output.

For example, if the channel 0 is active, the main state machine 44 starts up the operation state machine 410 corresponding to the channel 0. It is assumed that the operation state machine 410 shifts the state of the data path unit 30 in the order of "Process 1," "Process 2," "Process 3," "Process 4," and "IDLE" to cause the data path unit 30 to perform the signal processing of the channel 0. If the first channel status signal corresponding to the channel 0 is output in this condition, the operation state machine 410 skips "Process 2" not including, for example, a delay process. Thereafter, if the second channel status signal is output regarding the channel 0, the main state machine 44 skips the start-up of the operation state machine 410 corresponding to the channel 0. As a result, all signal processing corresponding to the channel 0 is stopped. Thereafter, if audio data of the channel 0 indicating a sound is input and a channel status signal indicating this is output, the main state machine 44 starts up the operation state machine 410 in the subsequent sampling periods to restart the signal processing corresponding to the channel 0.

In this manner, this embodiment is shown by an arrangement in which individual processing to be performed under the control of the operation state machines 410 to 412 is switched between the start and stop conditions. Therefore, it is possible to perform the following operations: if processing can be stopped immediately after the input of audio data of a silence, for example, in the case of equalizer processing, it is stopped immediately after an output of the first channel status signal; if processing is preferably stopped after awaiting a clearance of all data stored in the memory for storing temporary data 31, for example, in the case of delay system processing, it is stopped at an output of the second channel status signal after that. This enables unnecessary operations to be skipped with higher time resolution and therefore enables holding down power consumption required for signal processing further.

What is claimed is:

1. An audio signal processor comprising:
   a data path unit that applies at least one arithmetical operation to an audio signal for performing signal processing of the audio signal;
   a mode register that stores mode information specifying the signal processing to be performed by the data path unit; and
   a state machine unit that sequentially feeds control signals for enabling the data path unit to apply at least one arithmetical operation to the audio signal so as to perform the signal processing, which includes the at least one arithmetical operation and which is specified by the mode information stored in the mode register, wherein
   the state machine unit generates a control signal every time a clock pulse is supplied at a given period for enabling the data path unit to perform the signal processing specified by the mode information stored in the mode register,
   the data path unit provides the state machine unit with a status signal, which indicates a state of the arithmetical operation under execution, and
   the state machine unit determines on the basis of the provided status signal a content of the control signal which should be sent to the data path unit when a next clock pulse is supplied.

2. The audio signal processor according to claim 1, wherein the state machine unit feeds the control signal conveying information indicating a location of input data of the audio signal to be subjected to the at least one arithmetical operation and information indicating an output destination for the result of the at least one arithmetical operation.

3. The audio signal processor according to claim 1, further comprising a plurality of interfaces that receive an audio signal from a source external to the audio signal processor or generate an audio signal based on a source signal supplied from the source external to the audio signal processor and that supply the audio signals to the data path unit, wherein the state machine unit generates a control signal for enabling the data path unit to execute the at least one arithmetical operation for converting a format of the audio signals supplied from the interfaces to a predetermined format.

4. The audio signal processor according to claim 3, wherein the state machine unit generates a control signal for enabling the data path unit to execute the at least one arithmetical operation for mixing a plurality of audio signals which have a same format and which are loaded into the data path unit.

5. The audio signal processor according to claim 1, wherein the state machine unit sequentially feeds the control signals for enabling the data path unit to continuously execute a plurality of arithmetical operations which constitute the signal processing specified by the mode information.

6. A method of processing an audio signal, comprising the steps of:

applying, by a data path unit, at least one arithmetical operation to an audio signal for performing signal processing of the audio signal;

registering mode information into a mode register, which specifies the signal processing to be performed;

sequentially feeding control signals for enabling application of the at least one arithmetical operation by the data path unit to the audio signal so as to perform the signal processing, which includes the at least one arithmetical operation and which is specified by the registered mode information;

generating, by a state machine unit, a control signal every time a clock pulse is supplied at a given period for enabling the data path unit to perform the signal processing specified by the registered mode information stored;

providing the state machine unit with a status signal, which indicates a state of the arithmetical operation under execution; and determining on the basis of the provided status signal a content of the control signal which should be sent to the data path unit when a next clock pulse is supplied.

7. A computer implemented method for use in an audio signal processor, the computer implemented method, when executed by the audio signal processor, performs the method comprising the steps of:

applying, by a data path unit, at least one arithmetical operation to an audio signal for performing signal processing of the audio signal;

registering mode information into a mode register, which specifies the signal processing to be performed;

sequentially feeding control signals for enabling application of the at least one arithmetical operation by the data path unit to the audio signal so as to perform the signal processing, which includes the at least one arithmetical operation and which is specified by the registered mode information;

generating, by a state machine unit, a control signal every time a clock pulse is supplied at a given period for enabling the data path unit to perform the signal processing specified by the registered mode information stored;

providing the state machine unit with a status signal, which indicates a state of the arithmetical operation under execution; and determining on the basis of the provided status signal a content of the control signal which should be sent to the data path unit when a next clock pulse is supplied.

* * * * *